H. R. STRAUSS.
PROCESS OF MAKING HOLLOW RUBBER ARTICLES.
APPLICATION FILED JULY 15, 1916.
1,263,141.
Patented Apr. 16, 1918.
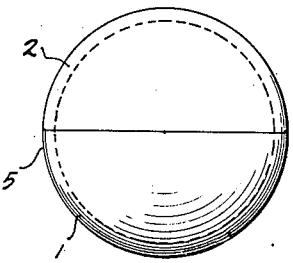
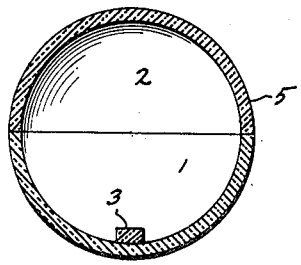
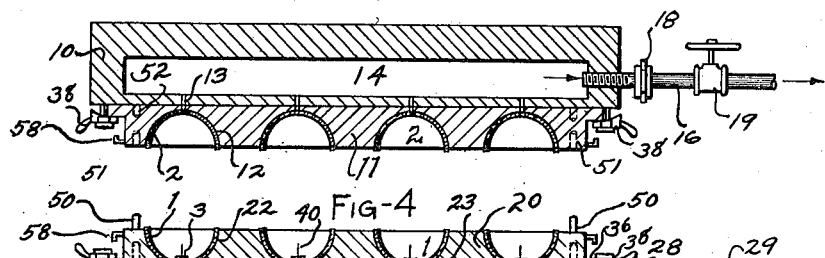
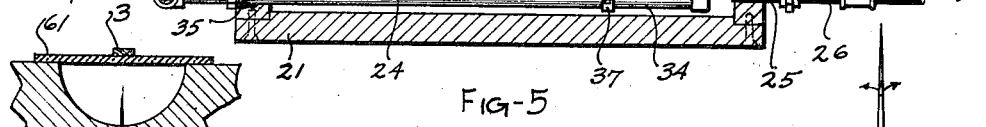
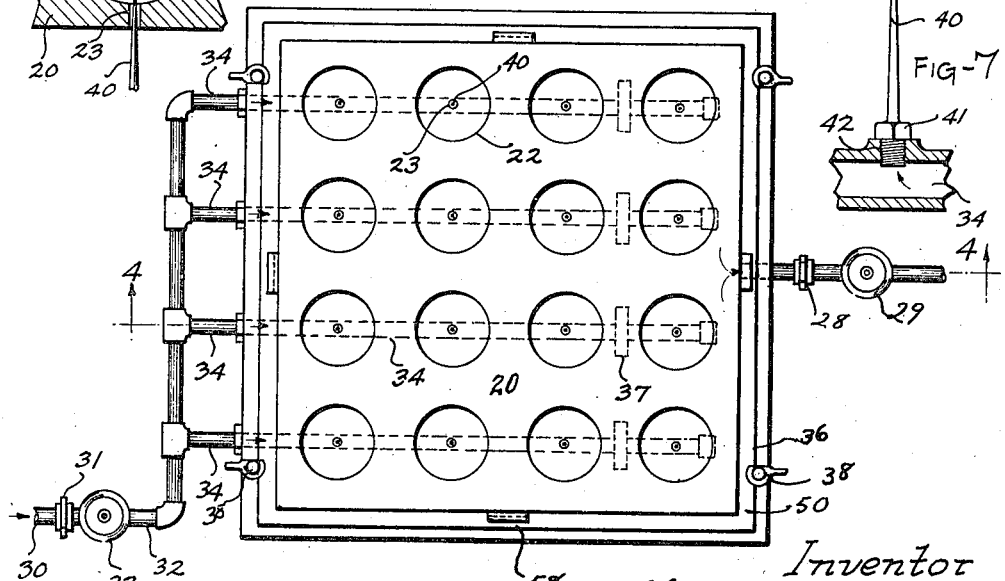
Inventor
Herbert R. Strauss
By Albert H. Bates,
Atty

UNITED STATES PATENT OFFICE.

HERBERT R. STRAUSS, OF CLEVELAND HEIGHTS, OHIO, ASSIGNOR TO THE ARANAR COMPANY, OF CLEVELAND, OHIO, A CORPORATION OF OHIO.

PROCESS OF MAKING HOLLOW RUBBER ARTICLES.

1,263,141.   Specification of Letters Patent.   Patented Apr. 16, 1918.

Application filed July 15, 1916.   Serial No. 109,415.

*To all whom it may concern:*

Be it known that I, HERBERT R. STRAUSS, a citizen of the United States, residing at Cleveland Heights, in the county of Cuyahoga and State of Ohio, have invented a certain new and useful Improvement in Processes of Making Hollow Rubber Articles, of which the following is a full, clear, and exact description, reference being had to the accompanying drawings.

The general object of this invention is to provide a simple efficient process of making hollow rubber articles. More specific objects are to reduce the cost of manufacturing such articles and at the same time produce an improved and better article.

My process includes placing of raw rubber stock in mold cavities, then, by a hollow needle, injecting an expansible fluid, such as air under pressure, into the interior of the article while in the mold, then withdrawing the needle, and then vulcanizing the article while retaining this pressure in the interior.

This invention is particularly concerned with the manufacture of tennis and other playing balls in which such inflation as above mentioned is necessary to provide proper resiliency. The walls of articles such as playing balls should be of as near a uniform thickness as possible and the parts thoroughly and properly vulcanized together. By my process I secure these desirable features by the inflation of the article with air under pressure while the parts of the article are in a state of raw rubber and in the mold. This insures uniform shape and thickness and provides the pressure for vulcanization thus avoiding the use of such volatilizing substances as ammonia powder which have the effect of hardening the walls of the article resulting in shortening the life of the same. The use of this same air under pressure within a ball or like article gives it resiliency and liveliness when finished, and eliminates the necessity of providing one means for holding the ball distended during vulcanization and another means for inflating the ball for use.

The manner of carrying out my process is illustrated in the accompanying drawings which show a tennis ball and a convenient apparatus for making the same according to this process, which will now be more fully described in connection therewith.

Referring to the drawings, Figure 1 is a side elevation of a ball made by my process; Fig. 2 is a cross section of the same; Figs. 3 and 4 are vertical transverse sections of the mold members used in carrying out my process; Fig. 5 is a plan of the mold member shown in Fig. 4; Fig. 6 is a detail of the clamping device for securing the mold members together; Fig. 7 is a detail, on an enlarged scale, of one of the needles for inflating the ball; and Fig. 8 is a sectional detail of one of the mold cavities showing the position of the raw rubber stock before being drawn into the cavity.

Referring to the drawings by numerals, 5 indicates a ball such as used for tennis and other athletic games and which is illustrative of any hollow rubber article which may be made by my process. In the form shown it comprises two halves 1 and 2 in the form of hemispheres joined at their meeting edges which are vulcanized together, as will be hereinafter described. At the center portion of one of the hemispheres is shown an inwardly projecting boss 3 preferably made of soft rubber secured on the inner surface of the ball and through which a hollow needle may be projected for the purposes of inflation, and which seals by cohesion and internal pressure upon the withdrawal of the needle, imprisoning the expansible fluid, such as air under pressure, within the ball.

10 indicates a support for a mold plate 11 provided with a plurality of regularly arranged cavities 12, shown as hemispherical and having openings 13 at their centers communicating through registering openings in the support with a space 14 from which the air may be exhausted through a suitable pipe indicated at 16, allowing a preponderance of pressure outside the mold to draw flat rubber plates into the cavities forming the parts 1 and 2. A pipe 16 is shown as connected with a short nipple leading from the cavity 14 by a union 18. This vacuum pipe is under the control of a suitable valve indicated at 19 in the pipe 16.

A corresponding mold plate 20 is shown as carried on a support 19, and is provided with hemispherical cavities 22 connected by passages 23 with a cavity 24 in the support from which the air may be exhausted by a pipe 26 connected with a short nipple 25 leading from the cavity to a union 28. The pipe 26 is under the control of a valve 29 and leading to a suitable pump. The mold support 19 is preferably made in two parts, the upper part being provided with downwardly extending sides or walls which fit a base portion 21 secured to the walls and closing the cavity 24. This construction permits the assembling and arranging in this cavity of pipes and needles for inflating the balls, as will now be described.

The mold plates 11 and 20 are preferably provided with outwardly extending flanges 36 which may be engaged by rotatable clamps 38 adapted to securely hold the mold plates to their supports while permitting them to be easily removed.

At 30 is indicated a pipe connected by a suitable union 31 with a pipe 32 controlled by a valve 33 and connected in turn with each of several pipes 34 leading through stuffing boxes 35 to the interior of the cavity 24 and closed at their inner ends. These pipes 34 are preferably arranged beneath rows of the cavities 22, which, as stated above, are provided with openings 23 at their centers, and through which may project upwardly extending hollow needles 40 constructed after the manner of hypodermic needles and having an enlarged head 41 made angular to provide for screwing the nipple 42 on the needle into a correspondingly threaded boss in the pipe 34. One of these needles is arranged for each of these cavities and projects upwardly into the same as shown in Fig. 4. The pipes 34 are shown as held in position by suitable brackets and clamps indicated at 37.

At 50 are indicated dowel pins extending upwardly from one of the mold members and coöperating with guide holes 51 on the other mold member to suitably position the molds and cause registration of the cavities. At 52 and 53 are dowel pins carried by the supports 10 and 19 respectively which extend into corresponding openings in the mold plates for causing the registration of the air passages 13 and 23. The dowel pins 53 are preferably slightly higher than the needles 40 whereby they may prevent the mold plate coming in contact with the needles and safely guide the openings 23 over the same.

The manner of carrying out my process will now be described in connection with the operation of the mechanism shown. Substantially round flat disks of suitable rubber stock are placed in position over the openings of the mold cavities on both the mold members 11 and 20 as indicated, for example, at 61 in Fig. 8, one of these members carrying a soft rubber plug 3 positioned substantially at its center. The flat disks of rubber are then drawn snugly into the mold cavities by exhausting the air from the cavities 14 and 24 bringing the halves of the article into the positions shown in Figs. 3 and 4. The halves 1, in being drawn to the surface of the mold cavities, are pierced by the needles 40 which extend through the soft rubber buttons or bosses 3. It is sometimes necessary when the walls of the article are comparatively thick to manually press the central portion of the lower halves over the needles in assisting the vacuum to draw the same snugly into the cavity.

The two mold members are now brought together and secured by means of wedge-shaped saddle members 55 extending over coöperating wedge-shaped ribs oppositely positioned on the mold plates 11 and 20 as indicated at 58. This saddle member acts in the manner of a female wedge to tightly hold the mold members when driven in position. The ribs 58 are preferably on each of the four sides of the mold plates to insure them being tightly held together. The valve 33 may then be opened admitting air under pressure to the pipes 34 from which this air may pass through needles 40 to the interior of the balls in the mold cavities.

Admitting air to the interior of the hollow articles while the parts within the cavities are in a state of raw rubber is a very advantageous feature in that it not only provides unusually good pressure for vulcanizing, but it tightly seats the ball in the cavity giving the same its proper form while the walls of the cavity prevent distortion. After such inflation the clamps 38 are released from their engagement with the flanges of the mold plates. The mold supports may then be separated and the mold removed from the lower support which withdraws the needles from the balls. The soft rubber buttons 3 instantly close the openings left by the needles, and, by reason of the internal pressure and natural cohesion of the material of these buttons, permanently close the openings left by the needles entrapping the air under pressure within the balls. The mold with its two halves clamped together, as described, may be removed to a suitable vulcanizing apparatus which may be adapted to receive a number of such molds at one time. Here the articles are vulcanized which finishes the curing of the raw rubber and vulcanizes the meeting edges of the two hemispherical parts providing a single unitary structure.

By the above described process I have been able to cheaply make hollow rubber articles having, if desired, very even and uniform thickness of walls, with the exception of a small rubber plug or button, and I have been able to construct them rapidly and make the most efficient use of the vulcanizing apparatus and eliminate a number of steps previously used in constructing such articles. The ball formed need not depend for its internal pressure upon a volatilizing substance either during vulcanization or afterward, and the pressure may be very high within the ball as the raw rubber is at no time caused to withstand internal pressure except when within a mold. Accordingly it is not necessary to provide, by a separate operation, a pressure for vulcanization which is lost or insufficient in the finished article, but by my process the article is inflated once which serves for vulcanization and gives proper resiliency and liveliness to the finished article.

Having thus described my invention, what I claim is:

1. The process of making hollow rubber articles comprising placing parts of the article in registering mold cavities, providing an inward projection of soft rubber, piercing the article with a hollow needle through such soft rubber projection, and inflating the article with fluid under pressure while within the mold cavity, withdrawing the needle and allowing the projection to seal the opening, and vulcanizing the article while within the same mold cavity.

2. The process of making hollow rubber articles comprising forcing the stock for the article in registering mold cavities by pneumatic pressure, piercing the article, inflating the article with fluid under pressure through the pierced opening while within the mold cavity, sealing said opening, then vulcanizing the article while within the same mold cavity and while containing the same fluid under pressure.

3. The process of making hollow rubber articles comprising pneumatically forcing stock for the article in a mold cavity thereby causing the wall of the article to be pierced with a hollow needle, and inflating the article with fluid under pressure while within the mold cavity, then vulcanizing the article while within the same mold cavity and while containing the same fluid under pressure.

4. The process of making hollow rubber articles comprising placing raw rubber stock across the openings of mold cavities, pneumatically forcing the stock into the cavities by producing a preponderance of pressure outside the cavity, causing the stock to be pierced by a hollow needle through a soft rubber button on one of the parts, then bringing the mold parts together, inflating the article with air under pressure through the hollow needle, and then vulcanizing the article with this fluid under pressure imprisoned within the same.

5. The process of making hollow rubber articles comprising placing sheets of raw rubber stock across the openings of mold cavities, one of said sheets carrying a soft rubber projection extending toward the other part, forcing the stock into the cavities by pneumatic pressure, causing a needle projecting into one of the cavities to meet and pierce one of said sheets through the plug as the rubber is brought to its seat in the mold cavity, inflating the article through said needle, then vulcanizing the parts of the article together to make a unitary structure.

6. The process of making hollow rubber balls comprising placing two circular disks across the mouths of hemispherical mold cavities, one of said disks carrying a soft rubber plug projecting toward the other, drawing the disks into the mold cavities by exhausting air from beneath the same, causing one of the disks and its plug to be pierced by a hollow needle as the rubber is brought to its seat, then bringing the parts of the mold together, inflating the article with fluid under pressure through said needle, vulcanizing the parts together while within said cavity to form a unitary structure imprisoning the pressure fluid, then removing the articles from the mold, the openings formed being closed by the soft rubber projections.

7. The process of making hollow rubber articles comprising placing rubber stock provided with a soft rubber plug on what is to be the interior of the article in a mold, projecting a hollow needle from the exterior through the soft rubber plug into the interior, supplying expansible fluid through such needle, separating the needle and the article enabling the plug to seal the opening through which the needle was projected, and thereafter vulcanizing the article.

8. The process of making hollow rubber articles comprising taking pieces of raw rubber stock, one of which is equipped with a soft rubber plug on the side adjacent to the other, causing such stock to seat in registering mold cavities, projecting a hollow device into the interior of the article through the plug, supplying compressed fluid through such hollow device, separating the device from the article to enable the plug to seal the opening, and thereafter vulcanizing the article making the sealing by the plug permanent.

9. The process of making hollow rubber articles comprising forcing stock for the article into mold cavities and over the point of a hollow needle projecting into one of such cavities, clamping the mold members together to closely hold the parts in conjunction, inflating the article with fluid under pressure delivered through said needle, withdrawing the needle and sealing the opening through which it was projected, and vulcanizing the article while containing the same fluid under pressure.

10. The process of making hollow rubber articles comprising placing stock across the mouth of a mold cavity into which a hollow needle projects, exhausting air from such cavity to cause the stock to seat in the cavity and the needle to perforate the stock, and supplying compressed fluid to the interior of the article through such needle.

11. The method of making hollow rubber articles comprising seating parts of the article in mold cavities by means of vacuum applied to the cavities, perforating one of such parts by means of a hollow needle across the point of which the stock is drawn by the vacuum, and when the parts of the article are together to inclose a space supplying compressed fluid to such space through the hollow needle.

12. The method of making hollow rubber articles comprising seating parts of the article in mold cavities by means of vacuum applied to the cavities, perforating one of such parts by means of a hollow needle across the point of which the stock is drawn by the vacuum, and when the parts of the article are together to inclose a space supplying compressed fluid to such space through the hollow needle, thereafter withdrawing the needle and vulcanizing the article without separating the mold containing it.

13. The process of making hollow rubber articles comprising supplying one of the parts with a soft rubber plug on the surface which is to be on the interior, drawing the parts into mold cavities by means of suction and at the same time causing a hollow needle to perforate the stock and said soft rubber plug, then, while the parts are held together to inclose a space, forcing compressed fluid through the hollow needle into such space, then withdrawing the hollow needle and allowing the plug to seal the opening it made, and then vulcanizing the article while in the same mold.

In testimony whereof, I hereunto affix my signature.

HERBERT R. STRAUSS.